US012603817B2

(12) United States Patent
Addaguduru et al.

(10) Patent No.: US 12,603,817 B2
(45) Date of Patent: Apr. 14, 2026

(54) SYSTEM AND METHOD FOR CROSS-SITE CONNECTION RESOLUTION IN DEPENDENCY MAPPING OF A CLOUD COMPUTING ENVIRONMENT

(71) Applicant: Microsoft Technology Licensing, LLC, Redmond, WA (US)

(72) Inventors: Chandra Mouli Addaguduru, Karnataka (IN); Atharva Mulmuley, Telangana (IN); Phalgun Garimella, Telangana (IN); Harveer Singh, Punjab (IN); Anisha Suman, Karnataka (IN)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 18/737,190

(22) Filed: Jun. 7, 2024

(65) Prior Publication Data

US 2025/0379792 A1    Dec. 11, 2025

(51) Int. Cl.
*H04L 41/12* (2022.01)
*H04L 41/082* (2022.01)
*H04L 43/062* (2022.01)

(52) U.S. Cl.
CPC ............ *H04L 41/12* (2013.01); *H04L 41/082* (2013.01); *H04L 43/062* (2013.01)

(58) Field of Classification Search
CPC ....... H04L 41/082; H04L 41/12; H04L 41/22; H04L 43/062
See application file for complete search history.

(56) References Cited

U.S. PATENT DOCUMENTS

| | | | | |
|---|---|---|---|---|
| 10,129,114 B1 * | 11/2018 | Kowalski | ................. | H04L 69/40 |
| 10,721,207 B1 * | 7/2020 | Sethuramalingam | ......................... | H04L 43/067 |
| 10,728,121 B1 * | 7/2020 | Chitalia | .............. | G06F 3/04817 |
| 12,386,722 B2 * | 8/2025 | Moser | ................... | G06F 11/079 |
| 2014/0201359 A1 * | 7/2014 | Uppalli | ................... | H04L 41/12 709/224 |
| 2014/0351832 A1 * | 11/2014 | Cho | ...................... | H04L 67/141 719/328 |
| 2016/0105350 A1 * | 4/2016 | Greifeneder | .......... | H04L 41/122 709/224 |

(Continued)

OTHER PUBLICATIONS

Extended European search report received for European Application No. 25180428.2, mailed on Oct. 29, 2025, 10 pages.

*Primary Examiner* — Jerry B Dennison

(57) ABSTRACT

A method, computer program product, and computing system for deploying a respective dependency agent on a plurality of computing devices within a cloud computing environment. A network topology subgraph associated with each computing device is generated. A placeholder for an unresolved connection is generated within the network topology subgraph associated with each computing device. Network mapping information associated with each computing device from the respective dependency agent is processed. The unresolved connection is resolved across the network topology subgraphs associated with each computing device in real-time by processing matching network mapping information from each computing device. An updated network topology subgraph associated with each computing device is generated by replacing the unresolved connection with a resolved connection.

20 Claims, 6 Drawing Sheets

10 deploying a respective dependency agent on a plurality of computing devices within a cloud computing environment
100 generating a network topology subgraph associated with each computing device
102 generating a placeholder for an unresolved connection within the network topology subgraph associated with each computing device
104 processing network mapping information associated with each computing device from the respective dependency agent
106 resolving the unresolved connection across the network topology subgraphs associated with each computing device in real-time by processing matching network mapping information from each computing device
108 generating an updated network topology subgraph associated with each computing device by replacing the unresolved connection with a resolved connection
110 performing data migration within the cloud computing environment using the updated network topology subgraph associated with each computing device
112

(56)  References Cited

U.S. PATENT DOCUMENTS

| | | | |
|---|---|---|---|
| 2017/0083643 A1* | 3/2017 | Seigel | G06F 11/00 |
| 2018/0227218 A1* | 8/2018 | Thubert | H04L 45/128 |
| 2019/0280949 A1* | 9/2019 | Wang | H04L 41/22 |
| 2019/0320046 A1* | 10/2019 | Bifulco | H04L 69/163 |
| 2020/0366756 A1* | 11/2020 | Vittal | H04L 43/045 |
| 2021/0111943 A1* | 4/2021 | Moser | H04L 41/142 |
| 2022/0027974 A1 | 1/2022 | Li et al. | |
| 2022/0414492 A1* | 12/2022 | Jezewski | G06N 5/04 |
| 2023/0070701 A1* | 3/2023 | Wang | H04L 41/0677 |
| 2024/0073097 A1* | 2/2024 | Kupisiewicz | H04L 41/0853 |
| 2024/0077852 A1* | 3/2024 | Jasper | G05B 19/4185 |
| 2024/0314056 A1* | 9/2024 | Bahal | H04L 43/50 |
| 2024/0348505 A1* | 10/2024 | Che | H04L 45/02 |
| 2025/0071030 A1* | 2/2025 | Jegarajan | H04L 41/22 |

* cited by examiner

10

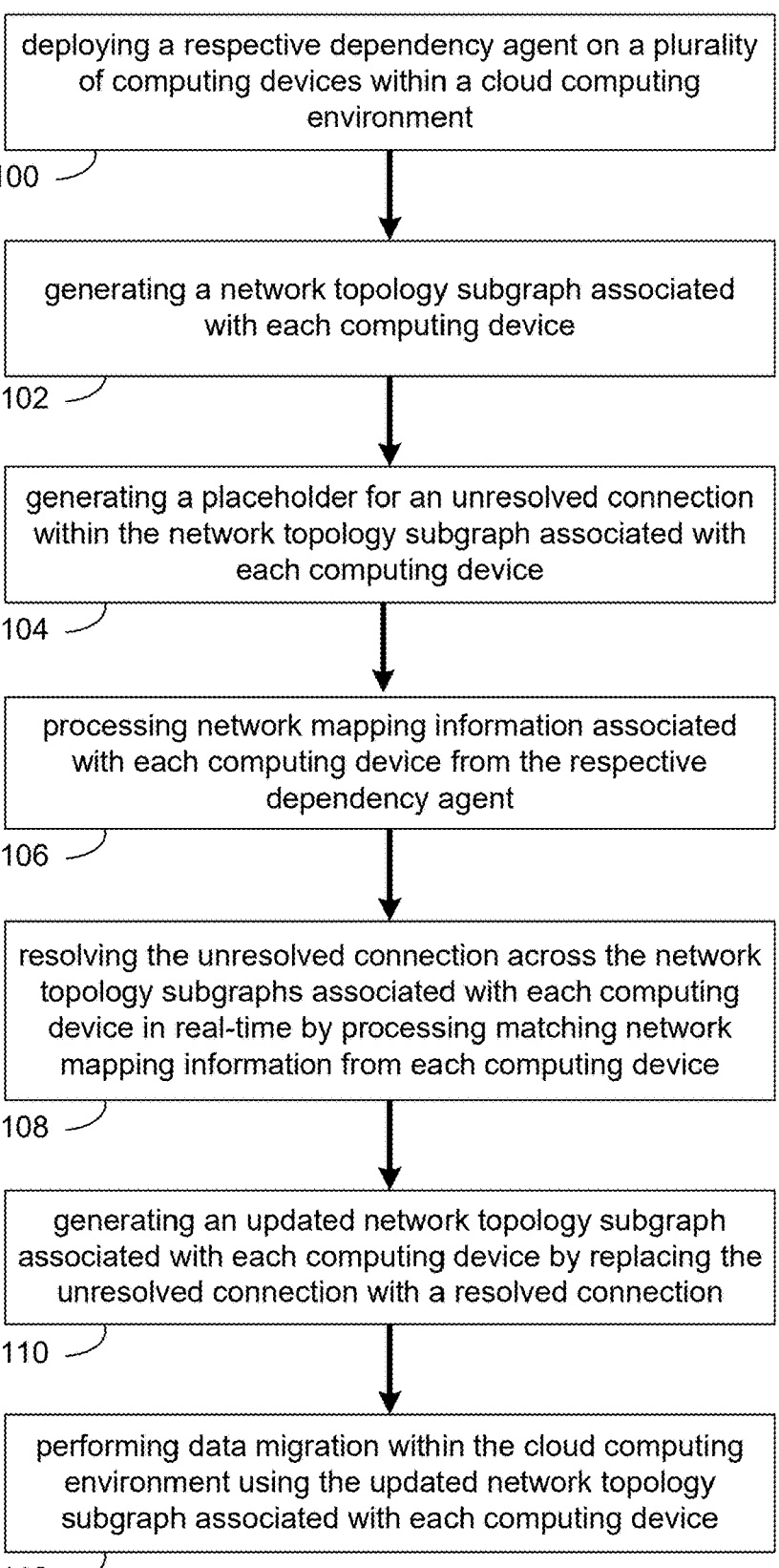

deploying a respective dependency agent on a plurality of computing devices within a cloud computing environment

100 generating a network topology subgraph associated with each computing device

102 generating a placeholder for an unresolved connection within the network topology subgraph associated with each computing device

104 processing network mapping information associated with each computing device from the respective dependency agent

106 resolving the unresolved connection across the network topology subgraphs associated with each computing device in real-time by processing matching network mapping information from each computing device

108 generating an updated network topology subgraph associated with each computing device by replacing the unresolved connection with a resolved connection

110 performing data migration within the cloud computing environment using the updated network topology subgraph associated with each computing device

SYSTEM AND METHOD FOR CROSS-SITE CONNECTION RESOLUTION IN DEPENDENCY MAPPING OF A CLOUD COMPUTING ENVIRONMENT

BACKGROUND

Cloud computing environments include various computing devices that execute processes and applications. As computing devices are added, connections between processes and applications across the cloud computing environment are discovered. These dependencies can be represented in a dependency map or graph. However, when these connections extend beyond a single "site" and involve multiple intervening computing devices, resolution of unknown connections using "agents" siloed to individual computing devices is limited in accuracy and delayed in time.

BRIEF DESCRIPTION OF THE DRAWINGS

FIG. 1 is a flow chart of one implementation of a cross-site connection resolution process;

Like reference symbols in the various drawings indicate like elements.

DETAILED DESCRIPTION

Figure 2:
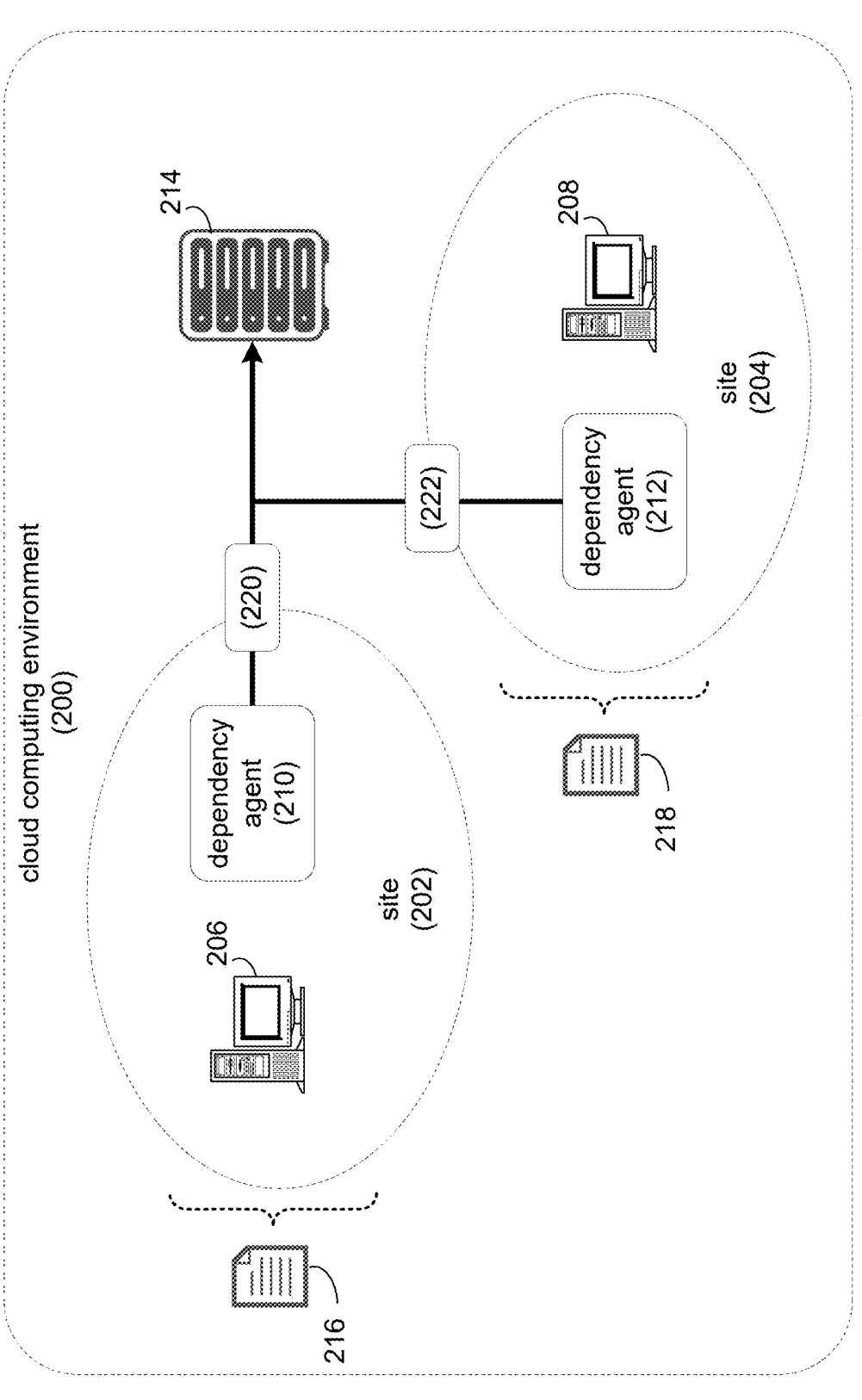
FIG. 2 is a diagrammatic view of the cloud computing environment with various sites and a cloud monitoring agent.

Implementations of the present disclosure provide a process for accurately resolving cross-site connection dependencies across a cloud computing environment in real-time. For example, when a computing device is added to a cloud computing environment, the computing device includes processes and applications that can interact with other computing devices, processes, and/or applications across the cloud computing environment. However, these resources and their dependencies on other computing devices, processes, and/or applications need to be discovered in order to be deployed within the cloud computing environment. Conventional approaches include siloed agents that are unable to process connections from outside of their domain or range of access (i.e., the computing devices, processes, and/or applications that are accessible by the agent). In this manner, cross-site (i.e., across separate physical and/or network domains) connections through various intervening computing devices are unknown and unresolvable by the agent of a given computing device.

As will be described in greater detail below, implementations of the present disclosure deploy a respective dependency agent on a plurality of computing devices within a cloud computing environment. A network topology subgraph associated with each computing device is generated. A placeholder for an unresolved connection (i.e., a connection within the network topology subgraph that is not coupled to or associated with a source or destination computing device, process, or application) is generated within the network topology subgraph associated with each computing device. Network mapping information (e.g., Transmission Communication Protocol (TCP) information describing the creation time, state, etc.) associated with each computing device is processed, using the respective dependency agent. This network mapping information and the network topology subgraphs of each computing device are provided to a server-side (or cloud computing environment side) computing device to manage the connections across the cloud computing environment.

Using the cloud computing environment side device, the unresolved connection is resolved across the network topology subgraphs associated with each computing device in real-time by processing matching network mapping information from each computing device. For example, network mapping information including when the unresolved connection was created, what ports it uses, and its state are used to match unresolved connections across multiple network topology subgraphs and/or within a single network topology subgraph. This approach allows connections to be resolved despite the presence of intervening computing devices, processes, and/or applications. An updated network topology subgraph associated with each computing device is generated by replacing the unresolved connection with a resolved connection. Using the updated network topology for the cloud computing environment, data migration and packet routing may be initiated or processed across the cloud computing environment without delay and can adaptively respond to the addition of new computing devices, processes, and applications by processing network mapping information from separate dependency agents and resolving connections in real-time.

The details of one or more implementations are set forth in the accompanying drawings and the description below. Other features and advantages will become apparent from the description, the drawings, and the claims.

The Cross-Site Connection Resolution Process:

Referring to FIGS. 1-5, cross-site connection resolution process 10 deploys 100 a respective dependency agent on a plurality of computing devices within a cloud computing environment. A network topology subgraph associated with each computing device is generated 102. A placeholder for an unresolved connection is generated 104 within the network topology subgraph associated with each computing device. Network mapping information associated with each computing device is processed 106, using the respective dependency agent. The unresolved connection is resolved 108 across the network topology subgraphs associated with each computing device in real-time by processing matching network mapping information from each computing device. An updated network topology subgraph associated with each computing device is generated 110 by replacing the unresolved connection with a resolved connection.

In some implementations, cross-site connection resolution process 10 deploys 100 a respective dependency agent on a plurality of computing devices within a cloud computing environment. For example, during the operation of a cloud computing environment, various computing services are provided to connected users or applications using deployed computing devices. In one example, cloud computing environment include storage services, processing services, and application services provided over the Internet.

A computing device includes a physical and/or a virtual machine deployed in the cloud computing environment. In some implementations, a process is a set of instructions that execute functionality within the cloud computing environment.

Accordingly and referring also to FIG. 2, a cloud computing environment (e.g., cloud computing environment 200) includes various sites (e.g., sites 202, 204). A site is a combination of computing devices, processes, and/or applications deployed to the cloud computing environment with shared ownership or management. In one example, each site (e.g., sites 202, 204) is associated with a particular entity or customer. In another example, each site is defined primarily by an individual computing device (e.g., a single machine, a hypervisor, etc.) and/or a collection of physical computing resources and includes associated virtual resources that include various owning entities or customers (e.g., computing device 206 in site 202 and computing device 208 in site 204). In some implementations, computing devices include client computing devices (i.e., computing devices associated with clients of cloud computing environment 200) and server computing devices (i.e., computing devices that operate as servers within cloud computing environment 200). In some implementations, a site (e.g., sites 202, 204) have sub-sites (e.g., virtual sites) that define different domains, networks, etc.

In some implementations, sites 202, 204 are user-defined (e.g., using a graphical user interface) where computing devices, processes, applications, virtual resources, etc. are associated with a particular site. As will be discussed in greater detail below, each site may include a computing device that deploys a respective dependency agent to map dependencies associated with each site. However, these respective separate dependency agents are siloed in each site and are unable to resolve connections that extend beyond their access. Accordingly, cross-site connection resolution process 10 deploys 100 a respective dependency agent on a plurality of computing devices within a cloud computing environment. A dependency agent (e.g., dependency agent 210) is hardware and/or software component that collects data about processes running on a computing device (physical and/or virtual) and external process or application dependencies. In some implementations, dependency agent obtains and processes information associated with the computing device and/or site on which the dependency agent is deployed. Dependency agent 210 is configured to monitor computing device 206 and/or site 202 periodically (i.e., at a predefined interval) for changes in the computing device and/or site (e.g., the addition of new virtual machines, the removal of a computing device, the change in an application accessed by computing devices in the site, etc.). In some implementations, dependency agents 210, 212 obtain netstat data (i.e., active Transmission Communication Protocol (TCP) connections, ports on which the computing device is listening, Ethernet statistics, the IP routing table, IPv4 statistics, and IPV6 statistics), process identifiers and names, application identifiers and names, and ports used for connections between computing devices, processes, and/or applications.

As will be discussed in greater detail below, dependency agent 210 may be limited to site 202 and dependency agent 212 may be limited to site 204. Accordingly, dependency agents 210, 212 consolidate their monitored information and push their respective consolidated data to a cloud computing environment side device or cloud monitoring agent (e.g., cloud monitoring agent 214). Cloud monitoring agent 214 is a hardware and/or software component that aggregates and processes network topology information from each dependency agent. In some implementations, cloud monitoring agent 214 is able to aggregate network topology information from each dependency agent and/or network topology subgraphs generated by each agent. In this manner, cloud monitoring agent 214 can perform cross-site resolution of unknown or unresolved connections between computing devices, processes, and/or applications within cloud computing environment 200 in real-time. Accordingly, cloud monitoring agent 214 is able to access data and dependency information from one dependency agent to perform cross-stitching at any point across the cloud computing environment.

In some implementations, cross-site connection resolution process 10 generates 102 a network topology subgraph associated with each computing device. For example, a network topology subgraph (e.g., network topology subgraph 216) is a graph-based mapping of dependencies among computing devices, processes, and/or applications in a single site and/or across multiple sites within a cloud computing environment. In one example, dependency agent 210 generates 102 network topology subgraph 216 and dependency agent 212 generates 102 network topology subgraph 218. In another example, cloud monitoring agent 214 generates network topology subgraphs 216, 218. In some implementations, a network topology subgraph is formed from nodes representing computing devices, processes, and/or applications with edges representing connections (i.e., dependencies). As will be described in greater detail below, the connections include known connections (i.e., connections with known endpoints and dependency information) and unknown or unresolved connections (i.e., connections with unknown an unknown endpoint and/or unknown dependency information).

Figure 3B:
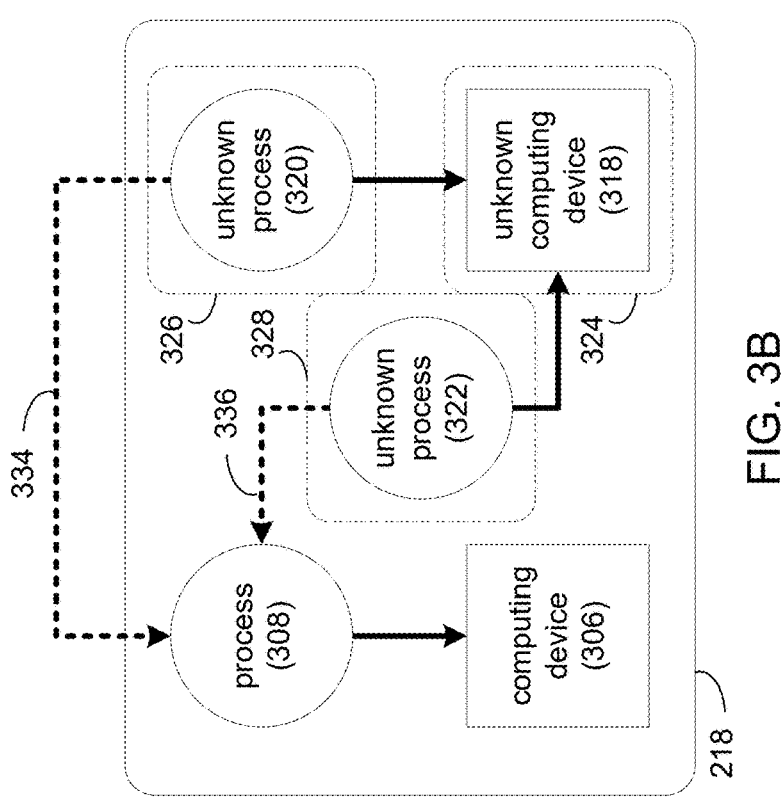
FIGS. 3A-3B are network topology subgraphs with unresolved connections and placeholders generated according to implementations of a cross-site connection resolution process.
Figure 3A:
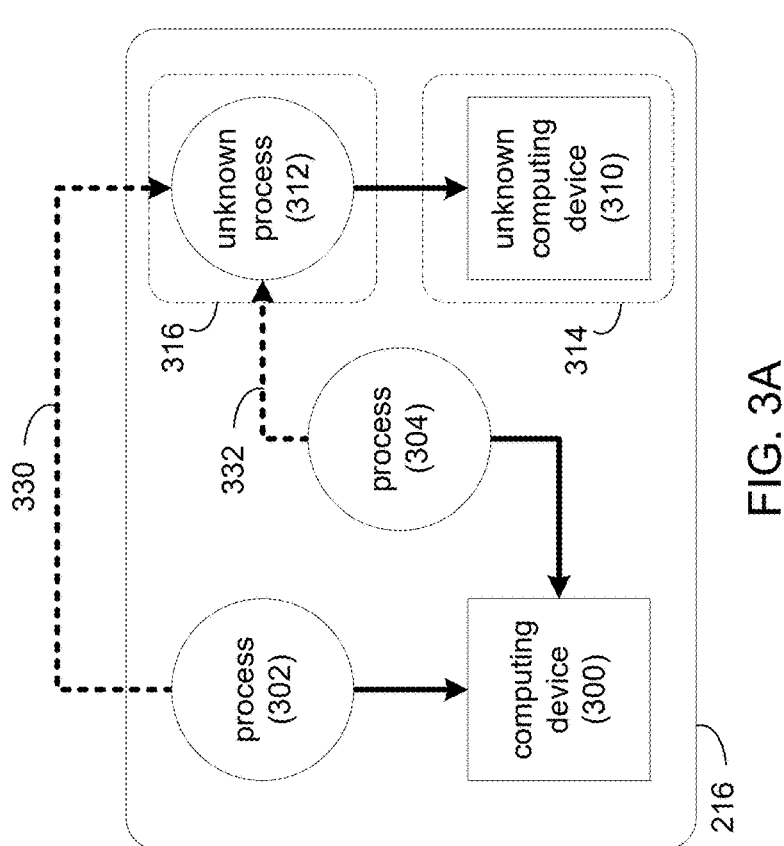

In some implementations, each network topology subgraph is associated with a separate site within the cloud computing environment. Referring also to FIG. 3A-3B, network topology subgraph 216 is shown as generated 102 in FIG. 3A for site 202 using network topology information from dependency agent 210. In this example, network topology subgraph 216 includes a known computing device (e.g., known computing device 300) and two known processes (e.g., known processes 302, 304). In another example and as shown in FIG. 3B, network topology subgraph 218 is generated 102 using network topology information from dependency agent 212. In this example, network topology subgraph 218 includes a known computing device (e.g., known computing device 306) and a known process (e.g., known process 308).

In some implementations, cross-site connection resolution process 10 generates 104 a placeholder for an unresolved connection within the network topology subgraph associated with each computing device. An unresolved connection is a relationship or dependency between computing devices, processes, and/or applications with an undefined endpoint (i.e., only one of the computing devices, processes, and/or applications is known to the respective dependency agent). Referring again to FIG. 3A, cross-site connection resolution process 10 identifies an unknown computing device (e.g., unknown computing device 310) and an unknown process (e.g., unknown process 312). In this example, cross-site connection resolution process 10 generates 104 a placeholder for an unknown computing device (e.g., placeholder 314 for unknown computing device 310), and a placeholder for the unknown process (e.g., placeholder 316 for unknown process 312). Referring again to FIG. 3B, cross-site connection resolution process 10 identifies an unknown computing device (e.g., unknown computing device 318) and two unknown processes (e.g., unknown processes 320, 322). In this example, cross-site connection resolution process 10 generates 104 a placeholder for an unknown computing device (e.g., placeholder 324 for unknown computing device 318), and placeholders for the unknown processes (e.g., placeholder 326 for unknown process 320 and placeholder 328 for unknown process 322, respectively).

In some implementations, cross-site connection resolution process 10 categorizes unresolved connections based upon, at least in part, the dependency agent that identifies the unresolved connection. For example, when the unresolved connection is between computing devices discovered by a single dependency agent only, cross-site connection resolution process 10 labels the unresolved connection depending on whether the client process is known (i.e., with a label "Unknown(c1)→P1(s1)", where "c1" is a reference to client-side, "P1" is a reference to the process, and "s1" is a reference to server-side) or the server process is known (i.e., with a label "P1(c1)→ Unknown(s1)"). In another example, when the unresolved connection is between the computing devices and the client computing device is discovered by the dependency agent and the server machine is discovered by another dependency agent, cross-site connection resolution process 10 labels the unresolved connection depending on whether the client process is known (i.e., with a label "Unknown(c1)→P1 (s1)") or the server process is known (i.e., with a label "P1(c1)→Unknown(s1)"). In another example, when the unresolved connection is between the computing devices, the server computing device is discovered by the dependency agent, and the client computing device is discovered by another dependency agent, cross-site connection resolution process 10 labels the unresolved connection depending on whether the client process is known (i.e., with a label "Unknown(c1)→P1 (s1)") or the server process is known (i.e., with a label "P1 (c1)→Unknown (s1)"). In some implementations, these labels are used to resolve dependencies of unresolved connections across sites within cloud computing environment 200.

In some implementations, the unresolved connection includes a single-site unresolved connection. For example and as shown in FIG. 3B, unresolved connection is within site 202 and may be resolvable by dependency agent 212 of site 204. In this example and as will be discussed in greater detail below, cross-site connection resolution process 10 resolves unresolved connections with network mapping information from dependency agent 210 as this unresolved connection is between computing devices, processes, and/or applications that are discoverable by a single dependency agent (e.g., dependency agent 210).

In some implementations, the unresolved connection includes a multi-site unresolved connection. For example and as shown in FIGS. 3A-3B, unresolved connections 330, 332 in FIG. 3A and unresolved connections 334, 336 extend beyond sites 202, 204 and are, therefore, unresolvable by the respective dependency agent of each site (e.g., dependency agent 210 of site 202 and dependency agent 212 of site 204). Accordingly, unresolved connections 330, 332, 334, 336 represent multi-site unresolved connections as they extend beyond a single site.

In some implementations, cross-site connection resolution process 10 processes 106 network mapping information associated with each computing device from the respective dependency agent. As discussed above, each respective dependency agent (e.g., dependency agents 210, 212) monitors and processes information from their respective computing device and/or site. For example, dependency agents 210, 212 process 106 network mapping information (i.e., information associated with the identity and address of computing devices, and the creation and/or state of connections between processes, applications, and/or computing devices that define dependencies in the operation of the processes, applications, and/or computing devices across the cloud computing environment) associated with each respective computing device and/or respective site. As shown in FIG. 2, cross-site connection resolution process 10 processes 106 network mapping information 220 from dependency agent 210 and network mapping information 222 from dependency agent 212.

In some implementations, the network topology information includes Transmission Control Protocol (TCP) information associated with various connections within the cloud computing environment. For example, TCP information is data concerning the establishment of a connection according to the TCP. For example, TCP defines how connections are established between clients and servers before data can be sent. In some implementations, TCP information is defined within a TCP segment that describes the source port, the destination port, a sequence number, and an acknowledgement number (among other types of information). In one example, the TCP information includes a TCP state and a TCP creation time. A TCP state is a representation of the state of operation of the connection according to various states defined by the TCP. For example, the TCP defines the following states that can identified on both endpoints:

"ESTABLISHED"—this represents an open connection where data received can be delivered. This is the normal state for the data transfer phase of the connection.

"FIN-WAIT-1"—this indicates that an endpoint is waiting for a connection termination request from the remote TCP, or an acknowledgment of the connection termination request previously sent.

"FIN-WAIT-2"—this indicates that an endpoint is waiting for a connection termination request from the remote TCP.

"CLOSE-WAIT"—this indicates that an endpoint is waiting for a connection termination request from the local user.

"CLOSING"—this indicates that an endpoint is waiting for a connection termination request acknowledgment from the remote TCP.

"LAST-ACK"—this indicates that an endpoint is waiting for an acknowledgment of the connection termination request previously sent to the remote TCP (which includes an acknowledgment of its connection termination request).

"TIME-WAIT"—this indicates that an endpoint is waiting for enough time to pass to be sure that all remaining packets on the connection have expired.

"CLOSED"—this indicates the absence of a connection state.

A TCP creation time is a record of when the connection is established between computing devices, processes, and/or applications. For example, when a connection is established between computing devices, processes, and/or applications, the network mapping information matches for those computing devices, processes, and/or appliances. In one example, a connection between process 302 on site 202 and process 308 on site 204 include matching TCP states and TCP creation times. Accordingly, while intervening computing devices, processes, and/or applications may exist between process 302 and process 308, the matching TCP state and TCP creation time indicate that the endpoint of unresolved connection 330 for process 302 is process 308 and that the endpoint of unresolved connection 334 for process 308 is process 302. Similarly, the matching TCP state and TCP creation time indicate that the endpoint of unresolved connection 332 for process 304 is process 312 and that the endpoint of unresolved connection 336 for process 308 is process 304.

In some implementations, cross-site connection resolution process 10 resolves 108 the unresolved connection across the network topology subgraphs associated with each computing device in real-time by processing matching network mapping information from each computing device. Resolving 108 an unresolved connection includes determining the endpoints for unresolved connection across the network topology subgraphs associated with each computing device. For example, conventional approaches to resolving connections were limited by the scope of access available to a respective dependency agent. In order to resolve these gaps across multiple sites, dependency agents in these conventional approaches send computational expensive queries to other dependency agents to provide information concerning specific computing devices, processes, and/or applications. Accordingly, conventional approaches are unable to provide these resolutions in real-time (i.e., during the time when dependencies are identified by dependency agents where unresolved connections are resolved centrally by cloud monitoring agent 214 as opposed to subsequently and individually resolving unresolved connections at each dependency agent).

In some implementations, cross-site connection resolution process 10 resolves 108 unresolved connections using the network mapping information (e.g., network mapping information 220, 222) to determine if the unresolved connections are identical. In one example, cross-site connection resolution process 10 resolves unresolved connections using source and destination network tuples, (a computing device identifier, a computing device Internet Protocol (IP) address, port). In one example, cross-site connection resolution process 10 resolves 108 the unresolved connection across the network topology subgraphs associated with each computing device in real-time by matching the TCP state and the TCP creation time of the unresolved connection in the network topology subgraph associated with each computing device. For example, when cross-site connection resolution process 10 identifies a match in the TCP state and TCP creation time, cross-site connection resolution process 10 sends queries to update the network topology subgraphs by resolving connection edges to point to the correct computing devices, processes, and/or application vertex and resolves an unknown placeholder vertex.

Figure 4B:
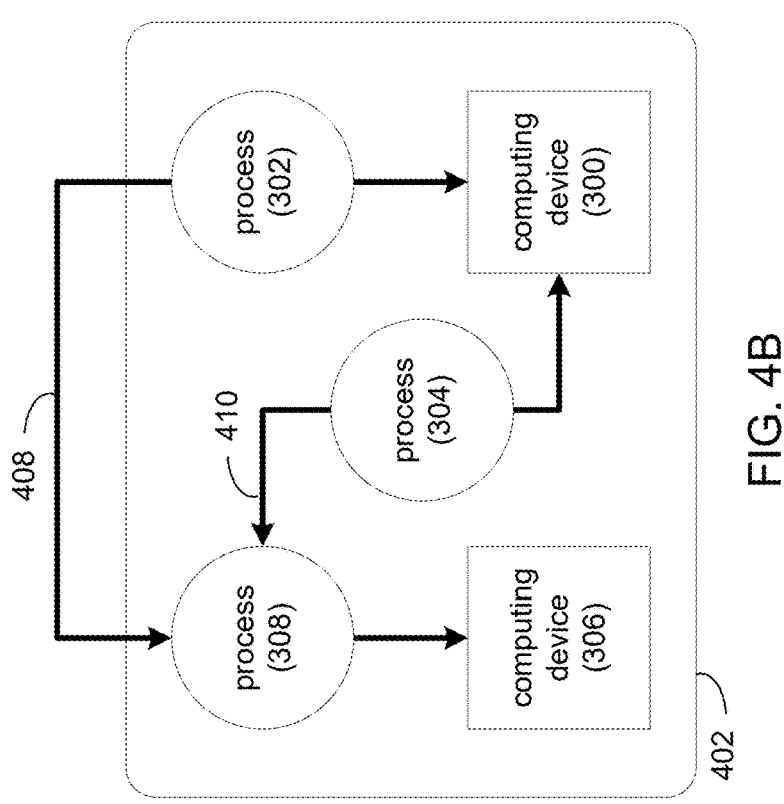
FIGS. 4A-4B are updated network topology subgraphs with resolved connections generated according to implementations of a cross-site connection resolution process.
Figure 4A:
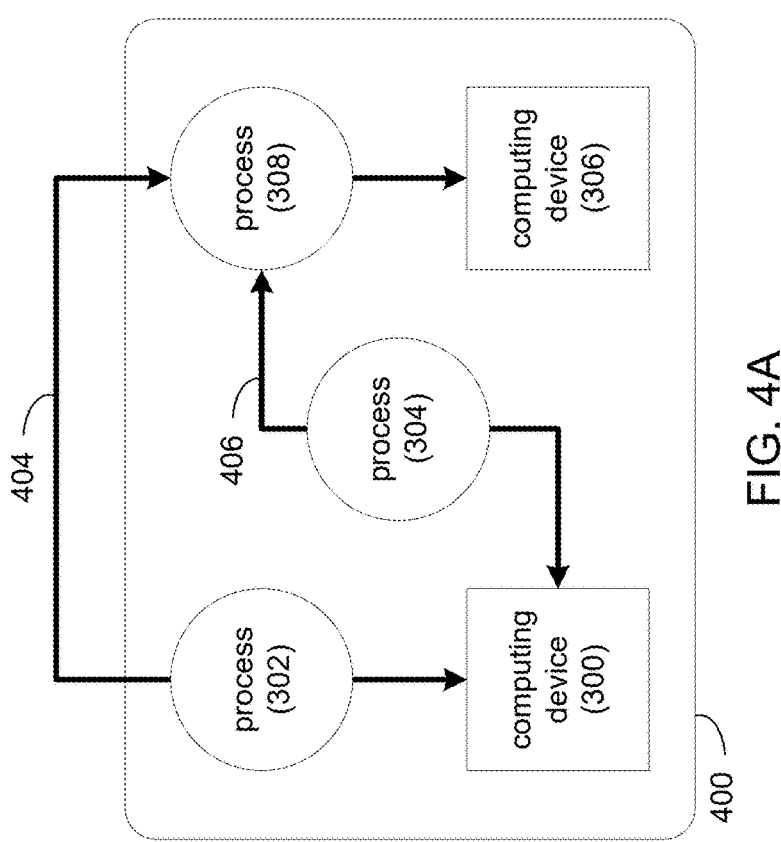
Figure 5:
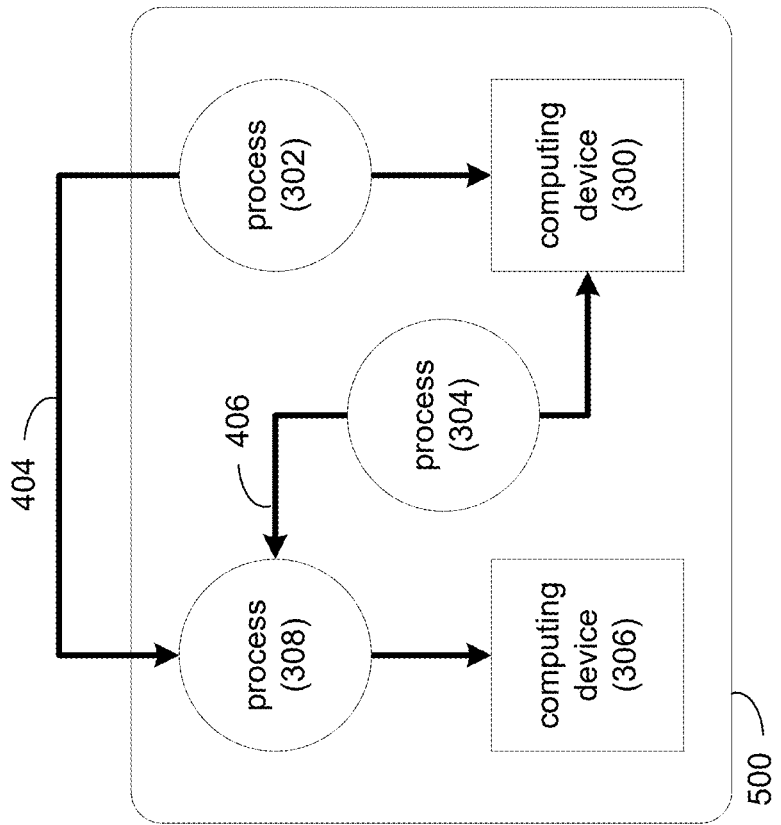
FIG. 5 is a single updated network topology graph with resolved connections generated according to implementations of a cross-site connection resolution process.

In some implementations, cross-site connection resolution process 10 generates 110 an updated network topology subgraph associated with each computing device by replacing the unresolved connection with a resolved connection. For example, cross-site connection resolution process 10 generates and/or updates dependency in each edge of unresolved connections (i.e., with a label "depends on"; "is connected to"; and/or "runs on") between computing device, process, and/or application vertices with the updated connection counts from the incoming dependency data from dependency agents. Referring also to FIGS. 4A-4B, cross-site connection resolution process 10 generates 110 updated network topology subgraphs 400, 402 by replacing unresolved connections 330, 332, 334, 336 with resolved connections 404, 406, 408, 410. This is also shown in FIG. 5 where cross-site connection resolution process 10 generates a single, updated network topology graph (e.g., updated network topology graph 500) with resolved connections 404, 406.

In some implementations, with updated network topology subgraphs 400, 402 (or combined updated network topology graph 500), cross-site connection resolution process 10 uses the resolved connections of the updated network topology subgraph(s) to perform various actions (e.g., incident management, data migration, patch management, etc.). For example and in some implementations, cross-site connection resolution process 10 performs 112 data migration within the cloud computing environment using the updated network topology subgraph associated with each computing device. For example, using updated network topology subgraph(s), cross-site connection resolution process 10 validates data migrations (i.e., the movement of data, processes, applications, virtual machines, etc. to another site and/or other computing device(s)) to help ensure that nothing is left behind and surprise outages do not occur by identifying any issues in dependencies with migration of particular computing devices, processes, and/or applications.

For example, cross-site connection resolution process 10 identifies all interdependent systems that need to migrate together, assesses system configuration and capacity, and identifies whether a running system is still serving users or is a candidate for decommissioning instead of migration. In some implementations, after cross-site connection resolution process 10 performs 112 data migration, cross-site connection resolution process 10 determines the client load and identity to verify that test systems and customers are connecting. If elements (e.g., subnet planning and firewall definitions) have issues, failed connections in the updated network topology subgraph(s) identify the systems that need connectivity. In this manner, cross-site connection resolution process 10 provides enhanced data migration by monitoring dependencies of computing devices, processes, and/or appliances before and after migration across multiple sites within the cloud computing environment in real-time to mitigate issues during the migration and to resolve any issues that appear following the migration.

Figure 6:
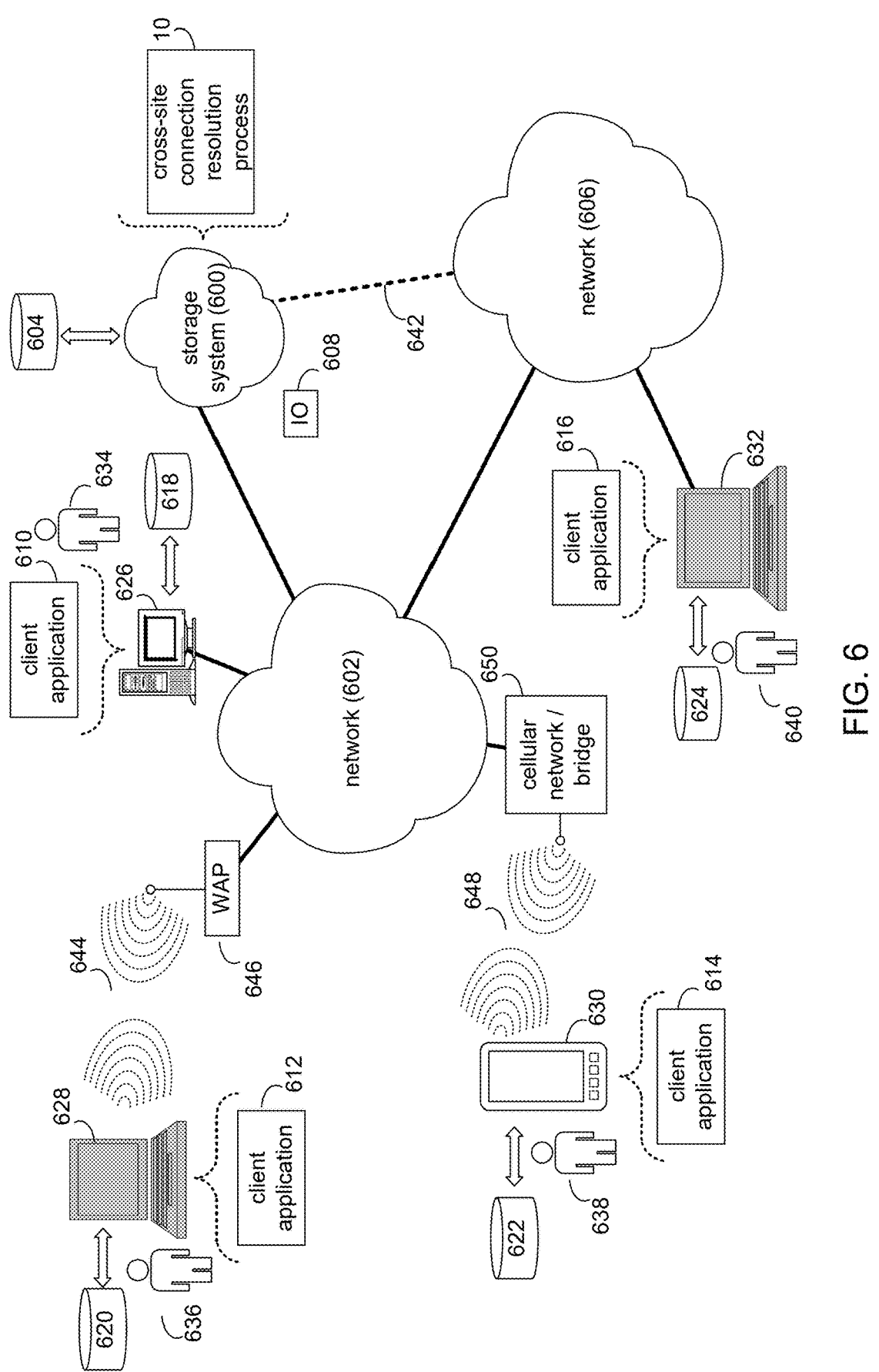
FIG. 6 is a diagrammatic view of computer system and a cross-site connection resolution process coupled to a distributed computing network.

System Overview:

Referring to FIG. 6, a cross-site connection resolution process 10 is shown to reside on and is executed by storage system 600, which is connected to network 602 (e.g., the Internet or a local area network). Examples of storage system 600 include: a cloud computing system, a Network Attached Storage (NAS) system, a Storage Area Network (SAN), a personal computer with a memory system, a server computer with a memory system, and a cloud-based device with a memory system. A SAN includes one or more of a personal computer, a server computer, a series of server computers, a minicomputer, a mainframe computer, a RAID device, and a NAS system.

The various components of storage system 600 execute one or more operating systems, examples of which include: Microsoft® Windows®; Mac® OS X®; Red Hat® Linux®, Windows® Mobile, Chrome OS, Blackberry OS, Fire OS, or a custom operating system (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

The instruction sets and subroutines of cross-site connection resolution process 10, which are stored on storage device 604 included within storage system 600, are executed by one or more processors (not shown) and one or more memory architectures (not shown) included within storage system 600. Storage device 604 may include: a hard disk drive; an optical drive; a RAID device; a random-access memory (RAM); a read-only memory (ROM); and all forms of flash memory storage devices. Additionally or alternatively, some portions of the instruction sets and subroutines of cross-site connection resolution process 10 are stored on storage devices (and/or executed by processors and memory architectures) that are external to storage system 600.

In some implementations, network 602 is connected to one or more secondary networks (e.g., network 606), examples of which include: a local area network; a wide area network; or an intranet.

Various input/output (IO) requests (e.g., IO request 608) are sent from client applications 610, 612, 614, 616 to storage system 600. Examples of IO request 608 include data write requests (e.g., a request that content be written to storage system 600) and data read requests (e.g., a request that content be read from storage system 600).

The instruction sets and subroutines of client applications 610, 612, 614, 616, which may be stored on storage devices 618, 620, 622, 624 (respectively) coupled to client electronic devices 626, 628, 630, 632 (respectively), may be executed by one or more processors (not shown) and one or more memory architectures (not shown) incorporated into client electronic devices 626, 628, 630, 632 (respectively). Storage devices 618, 620, 622, 624 may include: hard disk drives; tape drives; optical drives; RAID devices; random access memories (RAM); read-only memories (ROM), and all forms of flash memory storage devices. Examples of client electronic devices 626, 628, 630, 632 include personal computer 626, laptop computer 628, smartphone 630, laptop computer 632, a server (not shown), a data-enabled, and a dedicated network device (not shown). Client electronic devices 626, 628, 630, 632 each execute an operating system.

Users 634, 636, 638, 640 may access storage system 600 directly through network 602 or through secondary network 606. Further, storage system 600 may be connected to network 602 through secondary network 606, as illustrated with link line 642.

The various client electronic devices may be directly or indirectly coupled to network 602 (or network 606). For example, personal computer 626 is shown directly coupled to network 602 via a hardwired network connection. Further, laptop computer 632 is shown directly coupled to network 606 via a hardwired network connection. Laptop computer 628 is shown wirelessly coupled to network 602 via wireless communication channel 644 established between laptop computer 628 and wireless access point (e.g., WAP) 646, which is shown directly coupled to network 602. WAP 646 may be, for example, an IEEE 802.11a, 802.11b, 802.11g, 802.11n, Wi-Fi®, and/or Bluetooth® device that is capable of establishing a wireless communication channel 644 between laptop computer 628 and WAP 646. Smartphone 630 is shown wirelessly coupled to network 602 via wireless communication channel 648 established between smartphone 630 and cellular network/bridge 650, which is shown directly coupled to network 602.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be used. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object-oriented programming language. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet.

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general-purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, not at all, or in any combination with any other flowcharts depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method, executed on a computing device, comprising:
deploying a first dependency agent on a first computing device within a first site of cloud computing resources and a second dependency agent on a second computing device within a second site of cloud computing resources within a cloud computing environment;
generating a first network topology subgraph associated with the first site of the cloud computing resources using the first dependency agent and a second network topology subgraph associated with the second site of cloud computing resources using the second dependency agent, wherein the first network topology subgraph and the second network topology subgraph comprise at least one unresolved connection;
resolving the at least one unresolved connection of the first network topology subgraph and the second topology subgraph in real-time by processing matching network mapping information from the first dependency agent and the second dependency agent; and
replacing the at least one unresolved connection of the first network topology subgraph and the second network topology subgraph with a resolved connection.

2. The computer-implemented method of claim 1, further comprising:
performing data migration within the cloud computing environment using the first network topology subgraph and the second network topology subgraph with resolved connections.

3. The computer-implemented method of claim 1, wherein the first site of cloud computing resources and the second site of cloud computing resources comprise separate physical sites within the cloud computing environment.

4. The computer-implemented method of claim 3, wherein the unresolved connection includes a single-site unresolved connection.

5. The computer-implemented method of claim 1, wherein the unresolved connection includes a multi-site unresolved connection.

6. The computer-implemented method of claim 1, wherein first dependency agent and the second dependency agent collect network topology information including Transmission Control Protocol (TCP) information associated with connections within the respective first site of cloud computing resources and second site of cloud computing resources within the cloud computing environment.

7. The computer-implemented method of claim 6, wherein the TCP information includes a TCP state and a TCP creation time.

8. A computing system comprising:
a memory; and
a processor configured to:
deploy a first dependency agent on a first computing device within a first site of cloud computing resources and a second dependency agent on a second computing device within a second site of cloud computing resources within a cloud computing environment;
generate a first network topology subgraph associated with the first site of the cloud computing resources using the first dependency agent and a second network topology subgraph associated with the second site of cloud computing resources using the second dependency agent, wherein the first network topology subgraph and the second network topology subgraph comprise at least one unresolved connection;

resolve the at least one unresolved connection of the first network topology subgraph and the second topology subgraph in real-time by processing matching network mapping information from the first dependency agent and the second dependency agent; and replace the at least one unresolved connection of the first network topology subgraph and the second network topology subgraph with a resolved connection.

9. The computing system of claim 8, wherein the first site of cloud computing resources and the second site of cloud computing resources comprise separate physical sites within the cloud computing environment.

10. The computing system of claim 9, wherein the unresolved connection includes a single-site unresolved connection.

11. The computing system of claim 9, wherein the unresolved connection includes a multi-site unresolved connection.

12. The computing system of claim 8, wherein first dependency agent and the second dependency agent collect network topology information including TCP information associated with connections within the respective first site of cloud computing resources and second site of cloud computing resources within the cloud computing environment.

13. The computing system of claim 12, wherein the TCP information includes a TCP state and a TCP creation time.

14. The computing system of claim 13, wherein resolving the unresolved connection includes matching the TCP state and the TCP creation time of the unresolved connection.

15. A non-transitory computer readable medium having instructions stored thereon which, when executed by a processor, cause the processor to:

deploy a first dependency agent on a first computing device within a first site of cloud computing resources and a second dependency agent on a second computing device within a second site of cloud computing resource within a cloud computing environment;

generate a network topology subgraph associated with the first site of the cloud computing resources using the first dependency agent and a second network topology subgraph associated with the second site of cloud computing resources using the second dependency agent, wherein the first network topology subgraph and the second network topology subgraph comprise at least one unresolved connection;

resolve the at least one unresolved connection of the first network topology subgraph and the second topology subgraph in real-time by processing matching network mapping information from the first dependency agent and the second dependency agent;

replace the at least one unresolved connection of the first network topology subgraph and the second network topology subgraph with a resolved connection; and perform data migration within the cloud computing environment using the first network topology subgraph and the second network topology subgraph with resolved connections.

16. The non-transitory computer readable medium of claim 15, wherein the first site of cloud computing resources and the second site of cloud computing resources comprise separate physical sites within the cloud computing environment.

17. The non-transitory computer readable medium of claim 16, wherein the unresolved connection includes a single-site unresolved connection.

18. The non-transitory computer readable medium of claim 16, wherein the unresolved connection includes a multi-site unresolved connection.

19. The non-transitory computer readable medium of claim 15, wherein first dependency agent and the second dependency agent collect network topology information including Transmission Control Protocol (TCP) information associated with connections within the respective first site of cloud computing resources and second site of cloud computing resources within the cloud computing environment.

20. The non-transitory computer readable medium of claim 19, wherein the TCP information includes a TCP state and a TCP creation time.

* * * * *